(12) United States Patent
Judell

(10) Patent No.: US 10,536,320 B2
(45) Date of Patent: Jan. 14, 2020

(54) CANCELLATION SYSTEMS, METHODS, APPARATUSES, AND SOFTWARE FOR ACOUSTIC OR ELECTROMAGNETIC MEASUREMENT OR COMMUNICATIONS

(71) Applicant: Optimal Systems Laboratory, Inc., Cambridge, MA (US)

(72) Inventor: Neil Judell, Cambridge, MA (US)

(73) Assignee: Optimal Systems Laboratory, Inc., Cambridge, MA (US)

( * ) Notice: Subject to any disclaimer, the term of this patent is extended or adjusted under 35 U.S.C. 154(b) by 7 days.

(21) Appl. No.: 15/736,187

(22) PCT Filed: Jun. 13, 2016

(86) PCT No.: PCT/US2016/037243
§ 371 (c)(1),
(2) Date: Dec. 13, 2017

(87) PCT Pub. No.: WO2016/205129
PCT Pub. Date: Dec. 22, 2016

(65) Prior Publication Data
US 2018/0176068 A1 Jun. 21, 2018

Related U.S. Application Data

(60) Provisional application No. 62/175,621, filed on Jun. 15, 2015, provisional application No. 62/215,253, filed on Sep. 8, 2015.

(51) Int. Cl.
*H04L 27/36* (2006.01)
*H04B 1/04* (2006.01)
(Continued)

(52) U.S. Cl.
CPC ......... *H04L 27/366* (2013.01); *H04B 1/0475* (2013.01); *H04B 1/525* (2013.01); *H04L 5/14* (2013.01); *H04B 1/12* (2013.01)

(58) Field of Classification Search
CPC ....... H04L 27/366; H04L 5/14; H04B 1/0475; H04B 1/525; H04B 1/12
See application file for complete search history.

(56) References Cited

U.S. PATENT DOCUMENTS 6,650,624 B1 11/2003 Quigley et al.
7,106,656 B2 9/2006 Lerro et al.
(Continued)

FOREIGN PATENT DOCUMENTS

CN 101060349 A 10/2007
EP 0199571 A1 10/1986
(Continued)

OTHER PUBLICATIONS

Li Li, et al.; Interference Cancellation in In-Band Full-Duplex Underwater Acoustic Systems; 978-0-933957-43-5; 2015 MTS.
(Continued)

*Primary Examiner* — Ajay Cattungal
(74) *Attorney, Agent, or Firm* — Downs Rachlin Martin PLLC

(57) ABSTRACT

Aspects of the present disclosure include cancellation systems, methods, apparatuses, and software for acoustic or electromagnetic measurement or communications. In some embodiments, full-duplex measurement and/or communications systems can be implemented that permit simultaneous transmission and reception of signals. A cancellation signal generated in accordance with teachings herein may be produced by iteratively solving a Wiener filter problem and provided to a cancellation transducer to cancel unwanted signals in an analog fashion and/or adaptive cancellation module to cancel unwanted signals in a digital fashion. A number of new techniques for reducing or eliminating unwanted signals are described herein that can be used alone or in combination in order to tailor a signal cancelling (Continued)

system, method, apparatus, or software product to particular uses and environments.

25 Claims, 5 Drawing Sheets

(51) Int. Cl.
*H04B 1/525* (2015.01)
*H04L 5/14* (2006.01)
*H04B 1/12* (2006.01)

(56) References Cited

U.S. PATENT DOCUMENTS

| | | |
|---|---|---|
| 2003/0012258 A1 | 1/2003 | Schilling |
| 2006/0034447 A1* | 2/2006 | Alves ................. G10L 21/0208 379/406.01 |
| 2008/0043814 A1 | 2/2008 | Moffatt |
| 2009/0186582 A1* | 7/2009 | Muhammad ........... H04B 1/525 455/63.1 |
| 2009/0245335 A1* | 10/2009 | Fang ....................... H04B 3/30 375/222 |
| 2009/0316922 A1* | 12/2009 | Merks .................... H04R 25/30 381/60 |
| 2011/0002191 A1 | 1/2011 | DeMaio et al. |
| 2011/0305306 A1* | 12/2011 | Hu ..................... H03H 21/0021 375/350 |
| 2013/0099855 A1 | 4/2013 | Hahn et al. |
| 2013/0114468 A1 | 5/2013 | Hui et al. |
| 2015/0146589 A1 | 5/2015 | Webb et al. |
| 2015/0146765 A1 | 5/2015 | Moffatt et al. |
| 2015/0156003 A1 | 6/2015 | Khandani |
| 2016/0198348 A1 | 7/2016 | Jover |

FOREIGN PATENT DOCUMENTS

| | | |
|---|---|---|
| WO | 2003010949 A1 | 2/2003 |
| WO | 2005081686 A2 | 9/2005 |
| WO | 2008048534 A1 | 4/2008 |
| WO | 2011148341 A1 | 12/2011 |
| WO | 2014121290 A1 | 8/2014 |
| WO | 2016205129 A1 | 12/2016 |

OTHER PUBLICATIONS

Sahar Ayazian and Ranjit Gharpurey; Feedforward Interference Cancellation in Radio Receiver Front-Ends; 1549-7747; 2007; IEEE Transactions on Circuits and Systems—II; Express Briefs; vol. 54, No. 10, Oct. 2007.
Robbert Van Vossen; Anti-Submarine Warfare With Continuously Active Sonar; http://www.sea-technology.com/features/2011/1111/cont_active_sonar.php.
Duarte, Melissa et al., Full-Duplex Wireless Communications Using Off-The-Shelf Radios: Feasibility and First Results, 2010 Conference Record of the Forty Fourth Asilomar Conference on Signals, Systems and Computers; IEEE, Nov. 2010; pp. 1558-1562; ISBN: 978-1-4244-9722-5.
Bharadia, Dinesh et al., Full Duplex Radios; SIGCOM'13, Aug. 2013; ACM 978-1-4503-2056.
ISR and Written Opinion dated Nov. 18, 2016, in connection with PCT/US2016/037243.
International Search Report and Written Opinion in connection with PCT/US18/36925, dated Aug. 16, 2018.

* cited by examiner

CANCELLATION SYSTEMS, METHODS, APPARATUSES, AND SOFTWARE FOR ACOUSTIC OR ELECTROMAGNETIC MEASUREMENT OR COMMUNICATIONS

FIELD OF THE INVENTION

The present invention generally relates to the field of unwanted signal cancellation. In particular, the present invention is directed to cancellation systems, methods, apparatuses, and software for acoustic or electromagnetic measurement or communications.

BACKGROUND

Present-day reflective acoustic and electromagnetic measurement and communications typically employ the use of repetitive pulses. These pulses often rely on a signal processing technique called pulse compression to achieve tight time estimates via correlation between the transmitted and received waveforms and to increase the resulting signal-to-noise ratio. Further, various communications techniques are known that do not utilize repetitive pulses. However, various shortcomings of the prior art, such as limited dynamic range and half-duplex operation, can negatively impact performance in certain implementations.

SUMMARY OF THE DISCLOSURE

In one aspect, the present disclosure is directed to a method of performing cancellation for acoustic or electromagnetic measurement or communications. The method includes: receiving an output signal to be applied to a transmit transducer; introducing a delay to the output signal to produce a delayed output signal; applying the delayed output signal to the transmit transducer; receiving an input signal from a receiving transducer, wherein the input signal comprises at least a portion of the delayed output signal; and iteratively solving a Wiener filter problem as a function of the input signal, the output signal, and the delay to produce a first filtered input signal.

In another aspect, the present disclosure is directed to a method of performing cancellation for acoustic or electromagnetic measurement or communications. The method includes: receiving an output signal to be applied to a transmit transducer; introducing a delay to the output signal to produce a delayed output signal; applying the delayed output signal to the transmit transducer; receiving a digitally sampled signal derived from transmit transducer circuitry; receiving an input signal from a receiving transducer, wherein the input signal comprises at least a portion of the delayed output signal; and iteratively solving a Wiener filter problem as a function of the input signal, the output signal, the digitally sampled signal, and the delay to produce a first filtered input signal.

In yet another aspect, the present disclosure is directed to a cancellation system for acoustic measurement or communications. The system includes: a cancellation signal generator that produces a cancellation signal; a receiving transducer; a low-noise amplifier; and a summing junction configured to (1) add a signal received from the receiving transducer and the cancellation signal to produce a filtered signal and (2) provide the filtered signal to the low-noise amplifier.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Aspects of the present disclosure include cancellation systems, methods, apparatuses, and software for acoustic or electromagnetic measurement or communications that can be used to cancel unwanted signals, such as self-signal and self-noise. In some embodiments, full-duplex measurement and/or communications systems can be implemented that permit simultaneous transmission and reception of signals. A cancellation signal generated in accordance with teachings herein may be produced by iteratively solving a Wiener filter problem and provided to a cancellation transducer to cancel an unwanted signal in an analog fashion and/or adaptive cancellation module to cancel an unwanted signal in a digital fashion. A number of new techniques for reducing or eliminating unwanted signals are described herein that can be used alone or in combination in order to tailor a signal cancelling system, method, apparatus, or software product to particular uses and environments.

Notably, one or more "modules," or blocks, of code may be included in software in accordance with aspects of the present disclosure. It is to be understood that separate "modules" are described herein for ease of illustration and discussion. As a practical matter, the program code instantiating the invention could be organized in any one of a number of well-known manners to provide the functions described. While it is possible that separate code modules could be created to achieve the separate functions described, that is not required. So while various modules of the programs of the disclosure are described separately, in practice the actual modules of code instantiating the functions described for those separate modules could be intermingled; they do not have to be separate and independent sequences of code. Similarly, various "circuitry" is described below; this circuitry it not limited to implementation by analog electronics but can additionally or alternatively be implemented using digital processors, circuits, converters, or the like. One of ordinary skill in the signal cancellation art will understand that "modules" and "circuitry" can be implemented in any of a wide variety of manners using analog and/or digital components, as may be desired or required for particular uses and environments.

Figure 1:
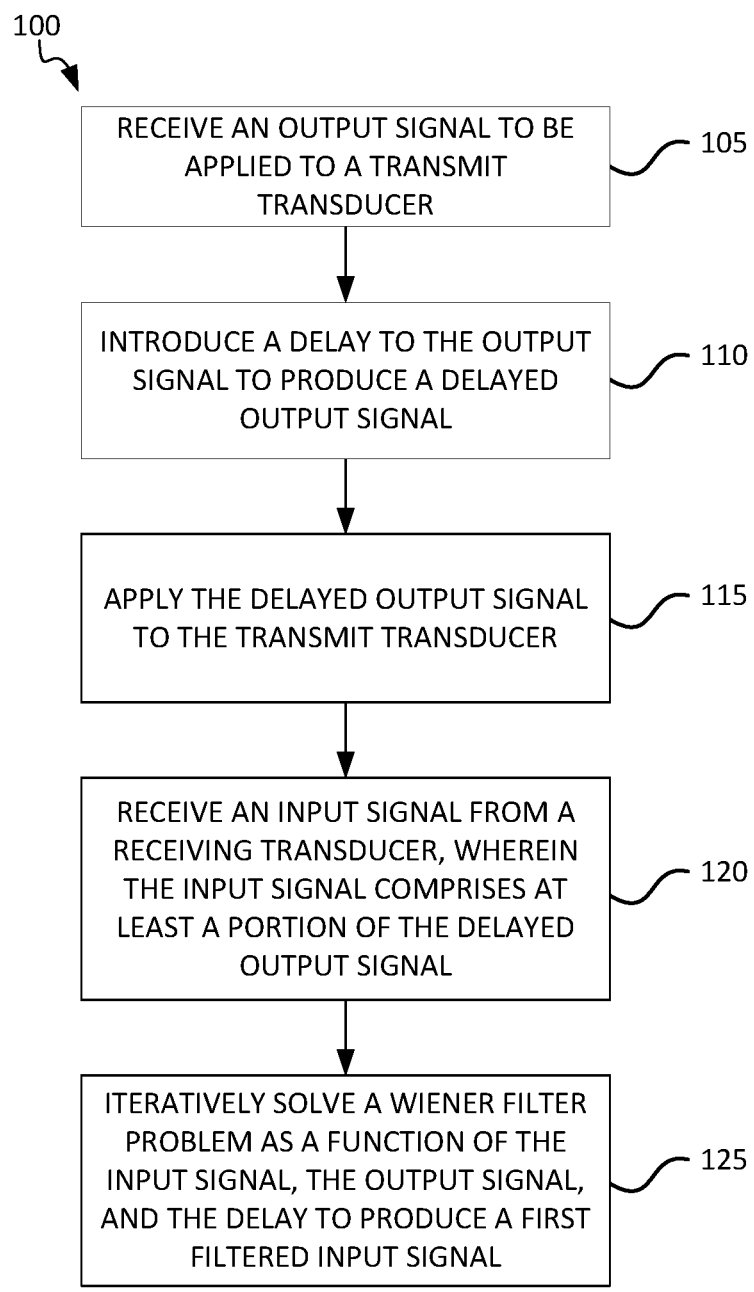
FIG. 1 is a flow diagram illustrating a method of performing cancellation for acoustic or electromagnetic measurement or communications in accordance with an aspect of the present disclosure.

Referring now to the drawings, FIG. 1 illustrates an exemplary method 100 of performing cancellation for acoustic or electromagnetic measurement or communications. Method 100 can be used to produce a filtered signal based on an output signal and an input signal comprising at least a portion of a delayed version of the output signal. For example, an output signal may comprise a measurement or communications signal to be output via a transducer and an input signal may comprise a portion of the output signal that is received at a receiver located nearer to the transducer than the subject to be measured or with which the output is intended to communicate. As shown in FIG. 1, method 100 may include a step 105 of receiving an output signal to be applied to a transmit transducer. Next, at step 110, method 100 may introduce a delay to the output signal to produce a delayed output signal. At step 115, method 100 may apply the delayed output signal to the transmit transducer. Step 120 may include receiving an input signal from a receiving transducer, wherein the input signal comprises at least a portion of the delayed output signal, and step 125 may include iteratively solving a Wiener filter problem as a function of the input signal, the output signal, and the delay to produce a first filtered input signal. Prior to explaining each of these steps in detail, in order to provide a context in which these steps may be carried out, two exemplary cancellation systems, as shown in FIGS. 2 and 3, will be described.

Figure 2:
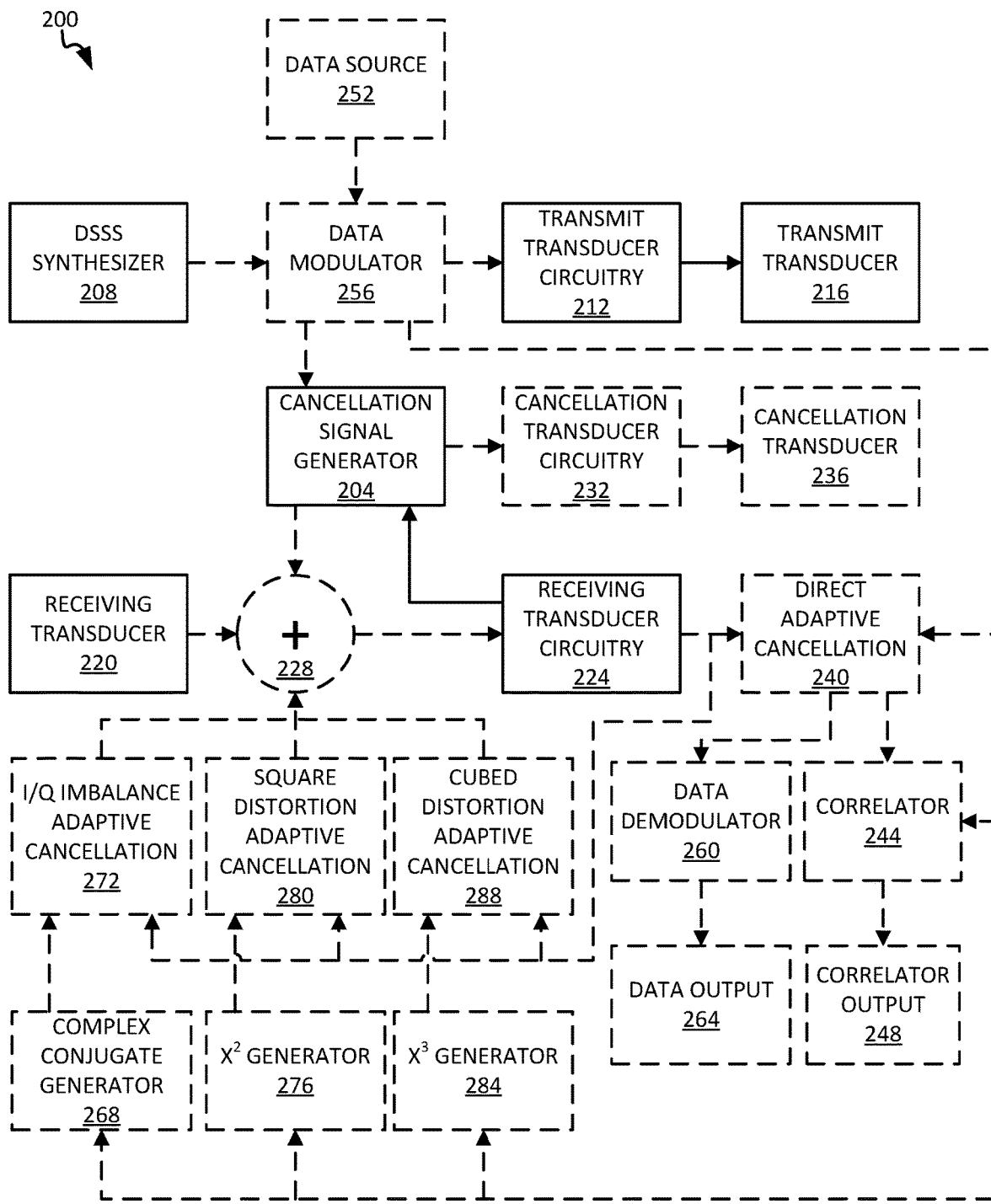
FIG. 2 is a block diagram of a cancellation system that can be used to implement the method of FIG. 1.
Figure 3:
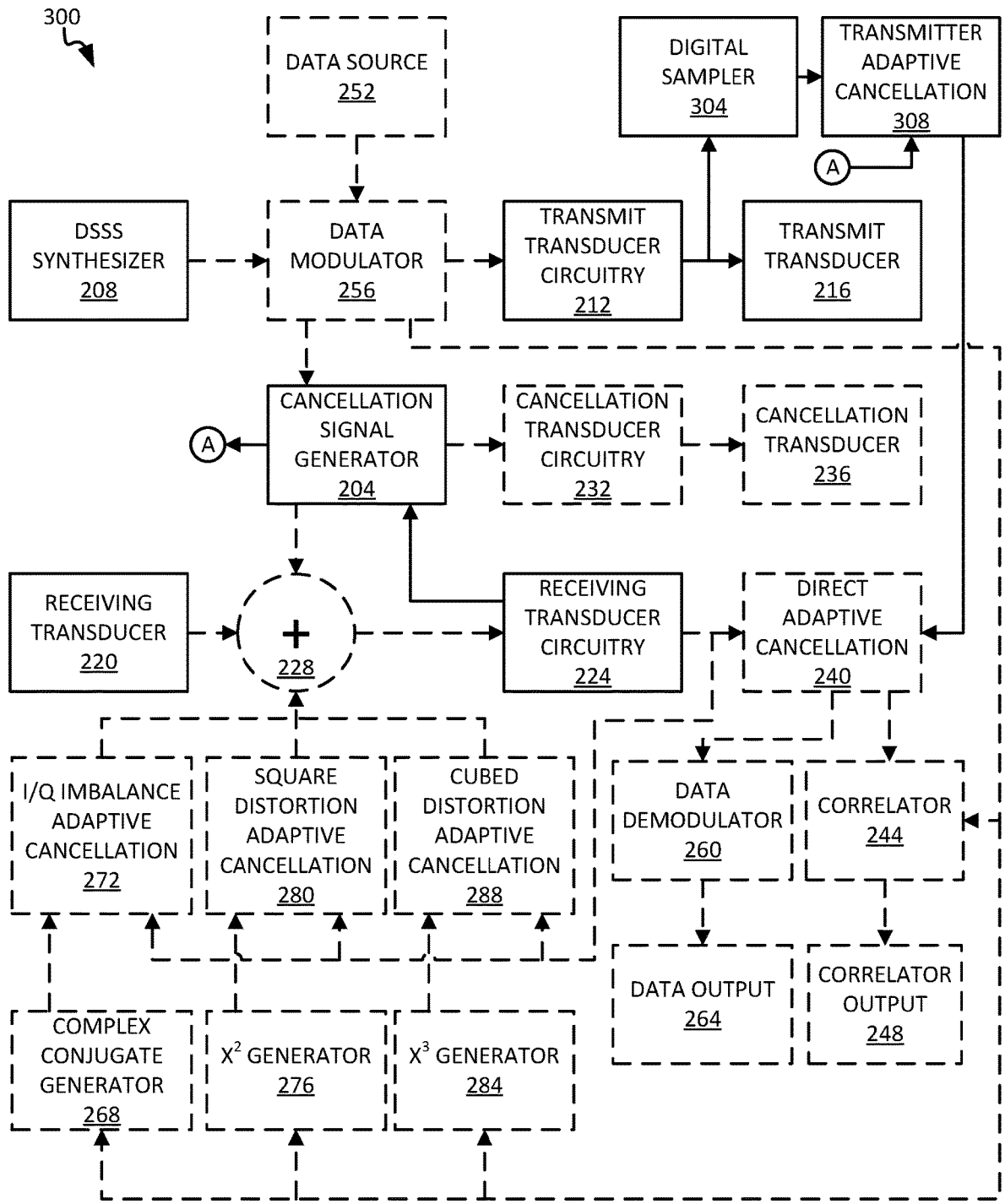
FIG. 3 is a block diagram of another cancellation system that can be used to implement the method of FIG. 1.

Turning now to FIG. 2, a cancellation system 200 is shown, including a cancellation signal generator module (CSGM) 204 that, in some embodiments, may be implemented as an Filtered-X or Filtered-U least mean squares, function, in the context of a Wiener filter, as further described herein below, and may serve as a foundation of system 200. Generally, in adaptive cancellation, a cancellation signal is attempted to be generated. The output of the receiver chain is monitored, compared to the originally transmitted signal, and a new cancellation signal is attempted to be generated. In this way, the cancellation continuously improves. In some embodiments, a direct-sequence spread spectrum (DSSS) synthesizer (DSSSS) 208 may produce a signal that may be provided to transmit transducer circuitry (TTC) 212, which may comprise, for example, a digital-to-analog converter (DAC), a power amplifier, a delay module for delaying the signal (typically from a range of 0.1 to 50 divided by the bandwidth of the transmitted signal), and/or an electromagnetic (e.g., radio frequency (RF)) mixer, and then passed on to transmit transducer 216 as a measurement signal. In some embodiments, the center frequency of a DSSS signal may be approximately 50 KHz with a bandwidth of approximately 50 KHz, although other parameters may be used. The output of DSSSS 208 may be acyclic, i.e., never repeating itself; however, in some embodiments, such as, for example, reflective measurement embodiments, it may be desirable to employ a waveform that is cyclic, i.e., one that repeats itself substantially or exactly with some period. In this case, a delay need not be introduced to the signal provided to transmit transducer 216 in order to maintain good performance, as future samples may be able to be predicted from a portion of the signal one period in the past. The same effect can be used by applying a cyclic shift to the DSSS signal applied to the various cancellation modules of FIG. 2; however, a cyclic requirement for this waveform would render that particular waveform difficult to use for communication, as communication data may destroy the periodicity of the waveform. Methods for generating binary sequences with good properties for this purpose are well-known. Gold codes, for example, are used in global positioning systems (GPS). In some embodiments, the DSSS waveform may be transmitted continuously. At the same time that the output from DSSSS 208 is provided to TTC 212, the output from DSSSS 208 may also be provided to CSGM 204 as one of two inputs on the basis of which the CSGM will generate a cancellation signal. A receiving transducer 220 may be collocated with transmit transducer 216 and may receive reflections of the measurement signal produced at the transmit transducer from a subject (not shown) as well as the measurement signal itself shortly after the transmit transducer transmits the measurement signal and likely prior to receiving any reflections, depending on the relative differences in distance between a measurable subject, the transmit transducer, and the receiving transducer. An output from receiving transducer 220 may be provided to receiving transducer circuitry (RTC) 224, which may comprise, for example, a low noise amplifier (LNA) and an analog-to-digital converter (ADC), optionally such that the output from the receiving transducer is fed through the LNA and ADC in that order, and/or electromagnetic (e.g., RF) mixer, which may comprise a local oscillator with an I/Q mixer, and then provided to CSGM 204 as a residual signal, the second of two inputs on the basis of which the CSGM will generate a cancellation signal. Using this method, the transfer function between the cancellation point and the receiver output is measured once (a calibration). A copy of the transmitted signal is played through this measured transfer function and correlated against the receiver output. This correlation function is used to adjust a Finite Impulse Response (FIR) filter. This FIR filter is applied to the signal to be transmitted and then used as output to the cancellation circuitry. Mathematically, this is a gradient descent optimization. Extremely rapid convergence of this algorithm (one or two steps) can be achieved by modifying the gradient descent method to a Recursive Least Squares (RLS) method. RLS is a quadratic solution to the gradient descent optimization method. Another viable alternative is a Filtered-U methodology, which is very similar to Filtered-X but is typically used to generate a cancellation filter of the Infinite Impulse Response (IIR) type.

Next, one or both of two different cancellation methods may be employed, among others further described herein. As shown in FIG. 2, in some embodiments, cancellation signal generator module (CSGM) 204 may provide a cancellation signal to a summation junction 228, which may sum the cancellation signal with the output from receiving transducer 220 and provide the summed signal to receiving transducer circuitry (RTC) 224 and then CSGM 204 as the second of two inputs on the basis of which the CSGM will generate a new cancellation signal. In this case, CSGM 204 generates an electronic signal that is added between receiving transducer 220 and RTC 224; this may provide sufficient cancellation if the signal produced by transmit transducer 216 is small enough that receiving transducer 220 is not driven to saturation and, thus, remains linear. In some embodiments, RTC 224 may simply act as a short circuit or shunt component.

As also shown in FIG. 2, in some embodiments, CSGM 204 may provide a cancellation signal to cancellation transducer circuitry (CTC) 232, which may comprise, for example, a DAC and power amplifier, which may then pass the cancellation signal to a cancellation transducer 236. In some embodiments, cancellation transducer 236 may be in acoustic or electromagnetic communication with receiving transducer 220. For example, cancellation transducer 236 and receiving transducer 220 may be collocated and in some embodiments the two transducers may be bonded to each another. In this case, cancellation transducer 236 may produce a cancellation signal in the form of an acoustic or electromagnetic signal; this may be necessary if the signal from transmit transducer 216 is large enough to drive receiving transducer 220 into nonlinear behavior. Acoustic energy falls off inversely proportional to the square of the distance between two elements. Therefore, if cancellation transducer 236 is used to produce an acoustic or electromagnetic cancellation signal and is much closer to receiving transducer 220 than the receiving transducer is to transmit transducer 216, then the cancellation transducer's power requirements for cancellation are significantly smaller than power requirements for the transmit transducer. For example, if there are 50 cm. between the transmit transducer 216 and receiving transducer 220 and cancellation transducer 236 is 1 cm. from the receiving transducer, then the amount of power required to operate the cancellation transducer is on the order of (1/(50*50)) or $\frac{1}{2500}^{th}$ the amount of power required for the transmit transducer. This is important because the cancellation signal typically should not significantly affect the output of transmit transducer 216. As a result of such a potential difference in power usage between transmit transducer 216 and receiving transducer 220, in some embodiments, cancellation transducer 236 may have a power rating in the range of 0.00001% to 75%, or in the range of 0.0001% to 50%, or in the range of 0.001% to 30%, or in the range of 0.01% to 10% of the power rating of the transmit transducer. In some embodiments, cancellation transducer 236 may be in physical contact with receiver transducer 220, e.g., with a ceramic bond or an adhesive such as cyanoacrylate; in other embodiments, the cancellation transducer may be in communication with the receiver transducer via an acoustic chamber, a waveguide, and/or a physical medium such as water or air. In some embodiments, one or more combinations of electrical, electromagnetic, and acoustic cancellation signals may be used for residual cancellation.

In some embodiments, cancellation transducer 236 and receiving transducer 220 may consist of a single transducer, such as a ceramic or piezoelectric transducer. In this case, a series coupling of a cancellation signal can force a ceramic receive transducer to act as its own cancellation transducer, which can reduce the system cost while providing higher reliability than a conventional bonded transducer. In some embodiments, transmit transducer 216 may be directional (i.e., designed and configured to emit signals in one or more particular directions at much higher power levels than other directions) such that coupling between the transmit transducer and receiving transducer 220 may be fairly weak; this can allow for a small cancellation transducer 236, which itself may be designed and configured as a directional transducer.

Turning now to FIG. 3, with continued reference to FIG. 2, a cancellation system 300 is shown that is very similar to cancellation system 200. Like-numbered components between FIG. 2 and FIG. 3, i.e., components with 200-series reference numerals, have been described above and will be described further below with reference to FIG. 2; however, in order to ensure that as many of the various alternative cancellation techniques shown in FIGS. 2 and 3 are clearly taught as reasonably possible, distinctions between system 200 and system 300 and will now be described. As shown in FIG. 2, a direct adaptive cancellation module (DACM) 240 may receive inputs from receiving transducer circuitry (RTC) 224 and DSSS synthesizer (DSSSS) 208 and produce a filtered version of the input received at receiving transducer 220 using methods similar to cancellation signal generator module (CSGM) 204 and/or other known cancellation methods. DACM 240 may then provide this filtered version of the signal received at receiving transducer 220 to a correlator 244, which may compare this filtered signal to the output produced by DSSSS 208 in order to generate a measurement as a correlator output 248. Turning now to FIG. 3, as shown, in some embodiments, DACM 240 may receive an input derived from the output signal provided to transmit transducer 216. In the example system 300 of FIG. 3, a digital sampler 304, which may comprise an attenuator, a down converter, and/or an ADC, may sample transmit transducer circuitry (TTC) 212 output, which may include noise and/or a portion of the analog output of a power amplifier in the TTC and digitize the signal. The signal output by a power amplifier in TTC 212 may be used to cancel thermal noise generated within the power amplifier. The signal present at the output of digital sampler 304 may be a linear combination of the desired signal, distortion terms, and thermal noise. A transmitter adaptive cancellation module (TACM) 308, or transmitter amplifier noise processor, may remove the effects of the desired signal and distortion terms from the signal output from a down converter and ADC in digital sampler 304, leaving only sampled amplifier noise.

Accordingly, the output of TACM 308 may be due to the thermal noise of a power amplifier in TTC 212. DACM 240 may then receive and process this signal to remove any residual effects of the sampled amplifier noise from the residual signal output from, e.g., a downconverter and/or ADC in TTC 212. In some embodiments, digital sampler 304 may include an additional receiver designed and configured to sample the signal produced by transmit transducer 216. As described above, digital cancellation can be applied to the signal received by the additional receiver to leave only the noise residue, which can then be digitally canceled for additional range. Any one or more of these cancellation techniques can be used alone or in combination with one another, as desired or necessary. Applicant explicitly contemplates combining aspects of system 200 with aspects of system 300; thus, these systems in FIGS. 2 and 3 should not be viewed as isolated systems, necessarily, but rather as illustrating a plethora of readily combinable alternatives that can be used to implement cancellation in as robust and/or as economically efficient a manner as desired or needed.

Turning back to FIG. 2, although the same components are also shown in FIG. 3, a number of optional additional elements of systems 200 and 300, which may be used alone or in combination with other elements of these systems, will now be described. In some embodiments, a data source 252 may provide a data signal to a data modulator 256, which may modulate the data signal with the output of DSSS synthesizer (DSSSS) 208. In order to demodulate a data signal from a signal received at receiving transducer 220, the output of direct adaptive cancellation module (DACM) 240 may be provided to a data demodulator 260, which may produce a data output 264 that, under the right conditions, will clearly resemble a data signal produced by a data source like data source 252. In some embodiments, additional receiving systems, which may comprise a receiving transducer that provides a signal to an ADC, which may then provide a signal to a correlator that may correlate the output of the ADC with a DSSS synthesizer (DSSSS) output, can be located remote from systems such as systems 200 and 300. The nature of DSSS signals permits many transmitters to operate in the same acoustic spectrum without mutual interference. A receiver with knowledge of the codes and/or subchannels used by each transmitter can selectively receive and separate the individually transmitted signals. Accordingly, transmit transducer 216 may be located remotely from receiving transducer 220, and optionally as part of a different system from systems 200 or 300, so long as the transmit transducer and the receiving transducer are able to communicate, e.g., synchronize encoding and decoding by way of DSSSS 208 and the DSSSS in the additional receiving system. Those of ordinary skill in the signal cancellation art will understand that various components of systems 200 and 300 can be used separately from other components to create dedicated transmit or dedicated receiving systems, neither of which may necessarily include all of the components of system 200 and/or 300. Code and subchannel orthogonality means that DSSSS 208 and the DSSSS in the additional receiving system may be identical. In some embodiments, DSSS synthesis may include a time-based coding system similar to p(y) codes employed in GPS. Various embodiments may be implemented in this manner so long as, e.g., both sender and receiver share a code book and adequate time synchronization. Furthermore, locations of one or more transmitters may be encoded into the DSSS signal as a data signal generated by, e.g., data source 252; this signal may then be modulated with the output of, e.g., DSSSS 208 at, e.g., data modulator 256. In some embodiments, multiple transmitters can employ Code Division Multiple Access (CDMA) to permit many shared communication channels at the same frequency and/or an accurate measurement of a subject by a passive receiver. It will be understood by those skilled in the art that the invention is not dependent on the type of signal produced by DSSSS 208, and that communication signal generation methods such as Orthogonal Frequency Division Multiplexing (OFDM) and/or signals like those employed by the Global System for Mobile communication (GSM), among others, may also be readily employed.

Figure 4A:
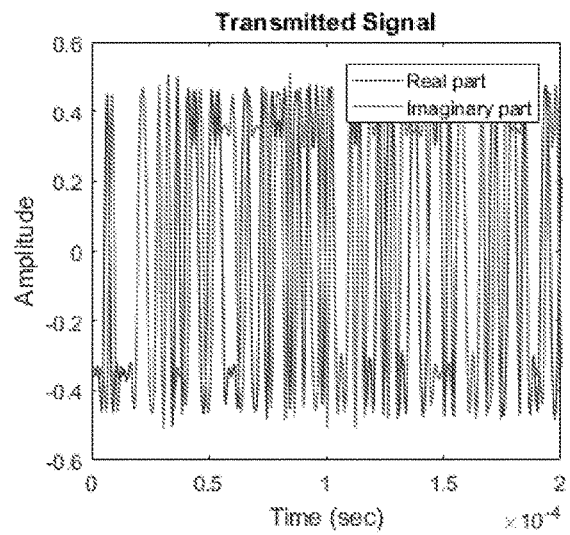
FIGS. 4A-4D illustrate examples of signals that may be generated or observed in accordance with aspects of the present disclosure.
Figure 4B:
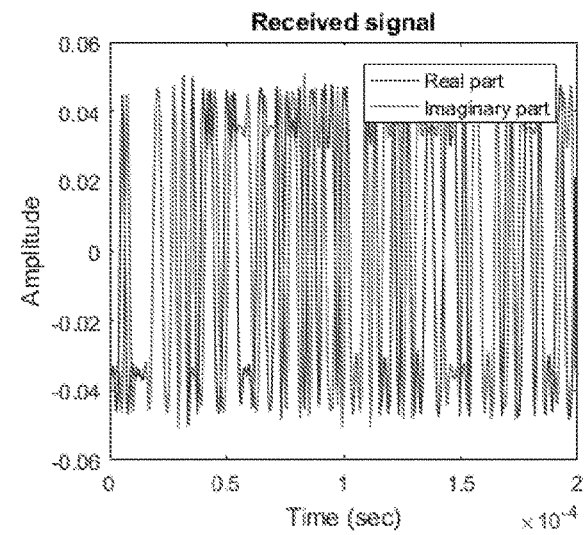
Figure 4C:
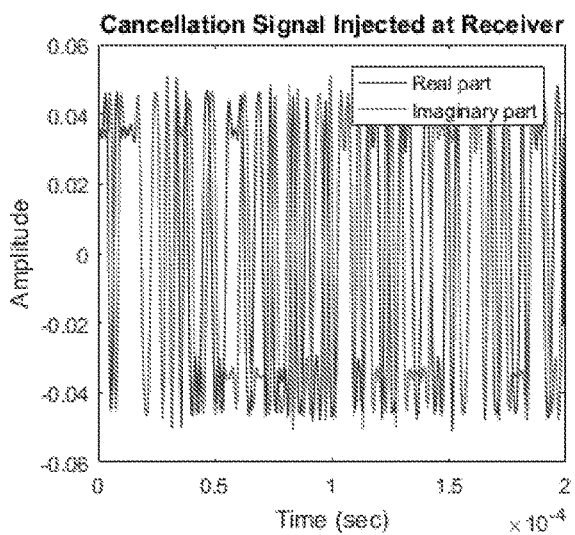
Figure 4D:
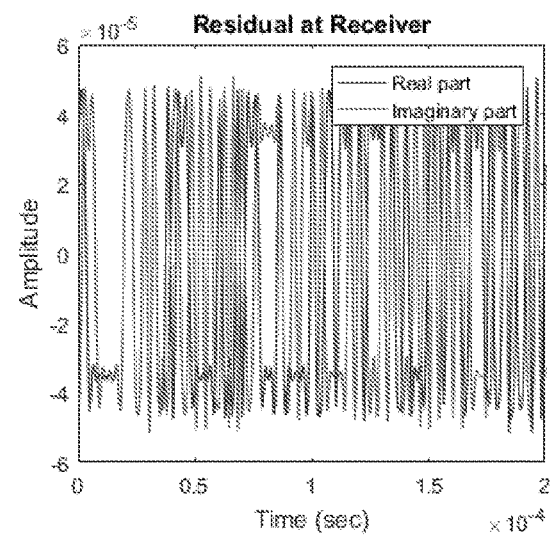

In order to provide examples of signals that may be used or observed in implementing aspects of the present disclosure, FIG. 4A illustrates an example of a quadrature phase shift keying (QPSK) modulated CDMA signal as it is generated by transmit transducer 216. FIG. 4B illustrates an example of a signal that may be received at receiving transducer 220 as a result of the signal shown in FIG. 4A being transmitted by transmit transducer 216. As shown in FIG. 4B, this signal is dominated by a slightly delayed copy of the transmitted signal shown in FIG. 4A, although it also contains a desired receive signal not visible in the graph because it has on the order of 1,000,000 times less power than the transmitted signal. FIG. 4C illustrates an example of a cancellation signal, such as may be generated by cancellation signal generator module (CSGM) 204; notably, this signal is 180 degrees out of phase and amplitude-matched with the signal shown in FIG. 4B. FIG. 4D illustrates the result of cancellation, i.e., the undisturbed, desired received QPSK-CDMA signal generated by cancellation system 200 in accordance with the signal shown in FIG. 4A.

With continued reference to FIG. 2, a number of additional cancellation elements of system 200 are shown, including: a complex conjugate generator (CCG) 268 and an in-phase/quadrature (I/Q) imbalance adaptive cancellation module (IQIACM) 272 that takes the output of the CCG as one of its inputs; a square, or $X^2$, generator 276 and a square distortion adaptive cancellation module (SDACM) 280 that takes the output of the square generator as one of its inputs; and a cube, or $X^3$, generator 284 and a cubed distortion adaptive cancellation module (CDACM) 288 that takes the output of the cube generator as one of its inputs. As shown in FIG. 2, for each of the modules IQIACM 272, SDACM 280, and CDACM 288, the second input may be the signal received by receiving transducer 220 after optionally passing through summing junction 228 and after passing through receiving transducer circuitry (RTC) 224.

In many cancellation systems, signal processing is performed at baseband, i.e., using complex data at frequencies surrounding DC. For these systems, the baseband signal may be up-converted to the real electrical signal by means of a local oscillator (LO) and an I/Q mixer. Multiplying the real part of the baseband signal by the in-phase (I) part of the LO, multiplying the imaginary part of the baseband signal by the quadrature (Q) part of the LO, and adding generates the desired electrical signal which is centered at the desired communication frequency. Similarly, a down-conversion set of mixers may be employed to bring the received signal from the communication frequency down to baseband for processing. For such systems, the relative gains of the IQ mixer multipliers are not accurate to the levels required and also change with age and environmental conditions. Therefore, it is desirable to cancel the effects of these mixers. As suggested by FIG. 2, a cancellation signal acting on the complex conjugate of the transmission signal can provide effective compensation (see, e.g., complex conjugate generator (CCG) 268 and I/Q imbalance adaptive cancellation module (IQIACM) 272).

For some transmission applications, a power amplifier used to drive a transmit transducer like transmit transducer 216 may have nonlinear distortion in excess of the amount of required cancellation. These distortions can be represented by a Taylor Series approximation, i.e., a sum of mathematical powers of the desired transmission signal. It can therefore be appreciated that additional cancellation signals, based on the mathematical powers of the desired transmission signal, can mitigate the nonlinear distortions at the receiver (see, e.g., square and cube generators 276, 284 and distortion adaptive cancellation modules 280, 288 in FIG. 2). The signal output by transmit transducer 216, complex conjugate terms, and Taylor series terms can be digitally canceled from a sampled signal like that generated by digital sampler 304 of FIG. 3, leaving only the transmitter random noise. This random noise signal can be used to digitally reduce the residual noise in the receiver system, after the above analog techniques have been employed. This typically should not be applied as an analog cancellation, as it relies on a signal transmitted in the past.

Having briefly described each of the components of cancellation systems 200 and 300 of FIGS. 2 and 3, respectively, with reference to FIG. 1 and continued reference to FIG. 2, a detailed example of how a system like system 200 of FIG. 2 might implement a method like method 100 of FIG. 1 will now be provided. As shown in FIG. 1, method 100 may include a step 105 of receiving an output signal to be applied to a transmit transducer; for example, this output signal may be provided by DSSS synthesizer (DSSSS) 208 or data modulator 256. Next, at step 110, method 100 may introduce a delay to the output signal to produce a delayed output signal; this may be implemented in data modulator 256 and/or transmit transducer circuitry (TTC) 212. At step 115, method 100 may apply the delayed output signal to the transmit transducer; this may be performed by TTC 212 by applying the delayed output signal to transmit transducer 216. Step 120 may include receiving an input signal from a receiving transducer, such as receiving transducer 220, wherein the input signal comprises at least a portion of the delayed output signal, and step 125 may include iteratively solving a Wiener filter problem as a function of the input signal, the output signal, and the delay to produce a first filtered input signal, which may be performed by cancellation signal generator module (CSGM) 204.

Mathematical Basis for Aspects of the Disclosure

As noted above, cancellation system 200 of FIG. 2 is shown including a cancellation signal generator module (CSGM) 204 that, in some embodiments, may be implemented as an Filtered-X, or Adaptive-U least mean squares, function, in the context of a Wiener filter. One issue that should be accounted for is the very high amplitude signals that are produced by transmit transducer 216 under some communication and measurement regimes: these signals are typically many times more powerful than any received signals sensed at receiving transducer 220. If the sensing and data acquisition systems in, e.g., cancellation system 200, had infinite dynamic range, then the problem would be one of purely digital cancellation. Generally, these techniques are quite well-known. However, a problem arises, because the dynamic range of sensors, amplifiers, and digitizers are, in fact, limited. They are generally insufficient to permit linear operation of full-duplex signaling.

Therefore, it is desirable to improve the dynamic range of sensors, amplifiers, and digitizers used in connection with aspects of the present disclosure. One method of cancellation is analog cancellation: a cancellation signal is introduced at the sensor, e.g., at receiving transducer 220, or at some point in the sensor amplification chain (e.g., ahead of the first active amplifier, which may be located in receiving transducer circuitry (RTC) 224). It is, however, desirable to use DSSS signals for many applications. In this case, simple cancellation methods fail; adjustment of gain and magnitude alone do not succeed in sufficient cancellation. In these simple methods, the feedforward network is defining a cancellation transfer function at a single frequency: the instantaneous frequency of the transmitter. This means the canceller need only consist of a single magnitude and phase at that frequency. For spread-spectrum, phase and gain need to be adjusted over the whole transmission band.

To solve this problem, Filtered-X cancellation can be used. In Filtered-X cancellation, the goal is to design a filter to act on a signal that is to be sent to transmit transducer 216 that will permit cancellation. This cancellation signal may be sent, via some means, to summing junction 228. This filter can be adjusted to cancel the transmitted signal at the receiver. Assuming that there is a linear transfer function between the cancellation signal and the receiver, it is possible to define the following:

s(t): the signal for the main transmitter (e.g., transmit transducer 216);

$h_s(t)$: the impulse response of the path from cancellation generation to receiver output;

$h_c(t)$: the impulse response of the adaptive cancellation filter (e.g., cancellation signal generator 204);

$h_t(t)$: the impulse response of the transmitter (e.g., transmit transducer 216) to receiver (e.g., receiving transducer 22) blast;

x(t): the desired received signal (including noise, but not self-signal); and $r(t)=s(t)\circ h_t(t)+x(t)-s(t)\circ h_s(t)\circ h_c(t)$: the signal present at the receiver, wherein ∘ designates convolution.

Filtered-X assumes that the desired signal and main signal are statistically independent, zero mean, and that the impulse response of the path from cancellation generation to receiver output is known. This then becomes a least-squares problem minimizing $E(|r(t)|^2)$, which may be solved via a gradient method: either gradient descent or RLS.

However, unlike feedback reduction of signal, where increasing feedback gain increases performance, and where component values tend not to be critical, feedforward cancellation techniques are extremely sensitive to value error. For example, a 1% error that is uncompensated can lead directly to a 40 dB performance floor. A one-degree phase error can lead to a 35 dB performance floor. Absolutely accuracy is imperative for good cancellation. If 80 dB performance is required, an accuracy of 100 parts-per-million (PPM) must be maintained. This means that a large part of what a cancellation system such as cancellation system 200 or 300 needs to overcome is component error and component value drift. A good cancellation system typically cannot be preconfigured with a predetermined "set-and forget" configuration; it needs to constantly adapt, occasionally quite rapidly. Component values can readily change by hundreds of PPM with a minor change in temperature or humidity. Blast signals can change by thousands of PPM due to local fade changes (such as someone walking nearby, or moving a cell phone). To that end, unlike feedback systems, deep cancellation requires fastidious attention to detail.

While it is not normally viewed this way, adaptive cancellation can be viewed as a Wiener filter problem. One can view the adaptive cancellation filter as working on a signal:

$$y(t)=h_s(t)\circ s(t),$$

to produce a minimum mean-squared estimate (MMSE) of:

$$z(t)=s(t)\circ h_t(t)+x(t).$$

The standard results can be applied to find a non-causal Wiener filter (solving the MMSE):

$$H_c(\omega) = \frac{S_{zy}(\omega)}{S_{yy}(\omega)}.$$

Under the appropriate conditions (which can be close to real-world), the above equation is reduced to:

$$H_c(\omega) = \frac{H_t(\omega)}{H_s(\omega)}.$$

In theory, this yields perfect cancellation. However, the solution for the filter described above typically is not causal: part of the impulse response lies in the future and cannot be implemented in the real world. Nonetheless, the Filtered-X algorithm will normally converge to the causal Wiener filter solution:

$$H_{cc}(\omega) = \frac{\left[\frac{S_{zy}(\omega)}{[S_{yy}(\omega)]^-}\right]_+}{[S_{yy}(\omega)]^+}.$$

This employs the standard Wiener-Hopf notation, in which the + subscript to the bracket implies causal chop (i.e., take the inverse Fourier transform, set the anti-causal portion to zero, then take the Fourier transform). The + superscript implies causal factorization (i.e., take the log of the function (it's positive definite), take the inverse Fourier transform, set the anti-causal portion to zero, multiply the value at time zero by 0.5, take the Fourier transform, exponentiate). The latter is sometimes called the min-phase factorization. The "−" superscript is anti-causal factorization, which is the same as causal factorization but with the causal portion set to zero. For real systems, the causal Wiener filter is almost always at least $1 \times 10^4$ in energy error with respect to the non-causal Wiener filter.

To avoid this problem, the present inventor discovered that a delay can be introduced between the transmit signal (e.g., the output of DSSS synthesizer (DSSSS) 208) and transmit transducer 216. In software, it is trivial to implement a delay; if analog hardware must be used, a delay can be implemented with a wire or cable, but small errors in cable impedance can introduce significant error. In this case, $$y(t) = h_s(t) \circ s(t) \circ \delta(t - t_d).$$

The Wiener filters can be characterized by parametrizing in the delay $t_d$:

$$H_c(\omega, t_d) = \frac{S_{zy}(\omega, t_d)}{S_{yy}(\omega)}$$

(note: the delay cancels in the denominator term);

$$H_{cc}(\omega, t_d) = \frac{\left[\frac{S_{zy}(\omega, t_d)}{[S_{yy}(\omega)]^-}\right]_+}{[S_{yy}(\omega)]^+}.$$

Thus, for almost all cases, it can be shown that:

$$\lim_{t_d \to \infty} L_2(H_c(\omega, t_d) - H_{cc}(\omega, t_d)) = 0.$$

For real-world cases, convergence of the limit is rapid and involves only small values of delay for cancellation levels that are appropriate for certain applications. In some embodiments, a radio center frequency of 2 MHz, a bandwidth of 400 KHz (very large bandwidth ratio relative to most spread spectrum applications), and a delay of 5 samples will produce very good results.

Many systems like systems 200 and 300 may be implemented in direct-convert or other heterodyne radio systems. In a heterodyne system, the RF signal is brought in through filters and preamplifiers to a mixer section. A down-convert quadrature sine wave is used to bring the signal down to base band (further Digital Down Converters (DDCs) may be employed). This section typically consists of a low-noise, high fidelity oscillator with in-phase and quadrature-phase components. The incoming signal may be split to the inputs of two analog multipliers, one for I and one for Q. The resulting outputs may then be provided to one or more ADC. These multipliers are a weak spot for cancellation. Errors in phase, and particularly in gain, can set the performance limit. The gain ratios of these multipliers are typically 1% or worse. This distortion product can be canceled by introducing another cancellation term using I/Q imbalance adaptive cancellation module (IQIACM) 240. This may be implemented as yet another Filtered-X filter, operating in addition to the standard cancellation filter (cancellation signal generator module (CSGM) 204), which operates on the complex conjugate of the transmitter signal; the following equation results:

$$s_{cancellation} = (h_c \circ s) + (h_{mix} \circ s^\dagger),$$

where the second term represents an adaptive filter acting on the complex conjugate of the signal.

It is notable that, in general, the signal and its conjugate may not be orthogonal, and so care must be employed and a decision made regarding orthogonalization of the adaptation loop.

Amplifiers for radio transmission tend to have distortion products, frequently on the order of 50 dB below main signal level. This can represent a cancellation floor. While intermodulation distortion products tend to be difficult to compute, a Taylor Series method can be used as an approximation. In this case, additional cancellation filters, each acting on a particular Taylor Series term results in the following equation:

$$s_{distortion}(t, m, n) = s^m(t)(s^n(t))^\dagger.$$

The Filtered-X method relies on good knowledge of the system transfer function. In particular, if the estimate of the system transfer function is in error by more than 90 degrees, instability can result. This is a particular problem in communication systems, where the sampling bandwidth may be far greater than the signal bandwidth. This results in RLS algorithms of insufficient rank, effectively amplifying the error of the model in the region where system response is low. The present inventor has discovered that convergence results can be improved by using a modification of Filtered-X referred to as filter-weighted Filtered-X. Instead of minimizing the simple least-squares problem of minimizing:

$$E(|r(t)|^2), r(t) = s(t) \circ h_t(t) + x(t) - s(t) \circ h_s(t) \circ h_c(t),$$

filter-weighted Filtered-X isntead minimizes:

$$E(|w(t) \circ r(t)|^2),$$

where w is the impulse response of a filter chosen such that its frequency response magnitude is near unity in the region where the phase of the system transfer function is known with relatively high confidence and decreases in magnitude in regions where the phase of the system transfer function is not known or is known with relatively lower confidence. This can effect full convergence, particularly in the cases described above with reduced rank signal autocovariance.

Experimental Arrangements

Experiment 1: Ettus B210 radio; TX1 output of Ettus B210 radio to splitter; outputs of splitter to one stick antenna and RX1 of Ettus B210 radio; TX2 output of Ettus B210 radio to a second stick antenna. 2.4 GHz center frequency; 100 mW; 2 MHz bandwidth. White noise measurement signal; 65 dB cancellation. Employed: delay buffer; I/Q imbalance cancellation; $3^{rd}$ power nonlinearity cancellation. Cancellation using two antennas and a summing junction.

Experiment 2: Ettus N200 radios (two per side; four total); TX output of first Ettus N200 radio to splitter; outputs of splitter to one ultrasonic transducer and LNA; output of LNA to RX input of Ettus N200 radio. TX output of second Ettus N200 radio to power amplifier, output of power amplifier to ultrasonic transducer. Same configuration duplicated on other side. Digital underwater acoustic communication using CDMA, also reflective measurements using various waveforms. 1 Watt output. Cancellation using two transmitters; summing junction; delay buffer. Cancellation in excess of 40 dB. 2 MHz center frequency; 400 KHz bandwidth. Voice communication implemented by digitizing waveforms and passing as data. Extremely high quality audio at 38.4 Kbits/sec. The same experiment was performed using whip antennas instead of ultrasonic transducers; this resulted in 70 dB cancellation.

Experiment 3: Ettus X310 radio; TX1 output to splitter; splitter output to LNA; LNA output to RX1 input of Ettus X310 radio; TX2 output to power amplifier; output of power amplifier to circulator; circulator outputs to antenna and splitter. 1 watt to 10 watts. 2.4 GHz center frequency; 100 MHz bandwidth. Various reflective waveforms tested (linear frequency modulation, white noise, phase-coded). Cancellation to date includes delay buffer; IQ imbalance; has demonstrated 80 dB analog cancellation.

Computing Devices

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Notably, systems implemented in accordance with the present disclosure need not use a laptop or desktop computer, per se, and can be implemented entirely in the context of embedded, mobile, or other devices. For example, computation load can be handled by a Field Programmable Gate Array (FPGA) and/or an Application Specific Integrated Circuit (ASIC), among other similar devices. Many ASICs and FPGAs include the functionality of a "virtual computer," but this functionality is not required in order to implement aspects of the present disclosure. Generally, the only limitation on the hardware used to implement aspects of the present disclosure is that the hardware must be able to perform the requisite functions; as such, any computing device, whether analog, digital, synchronous, asynchronous, or otherwise, could be used to implement aspects of the present disclosure.

Software implemented in accordance with aspects of the present disclosure may comprise a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 5:
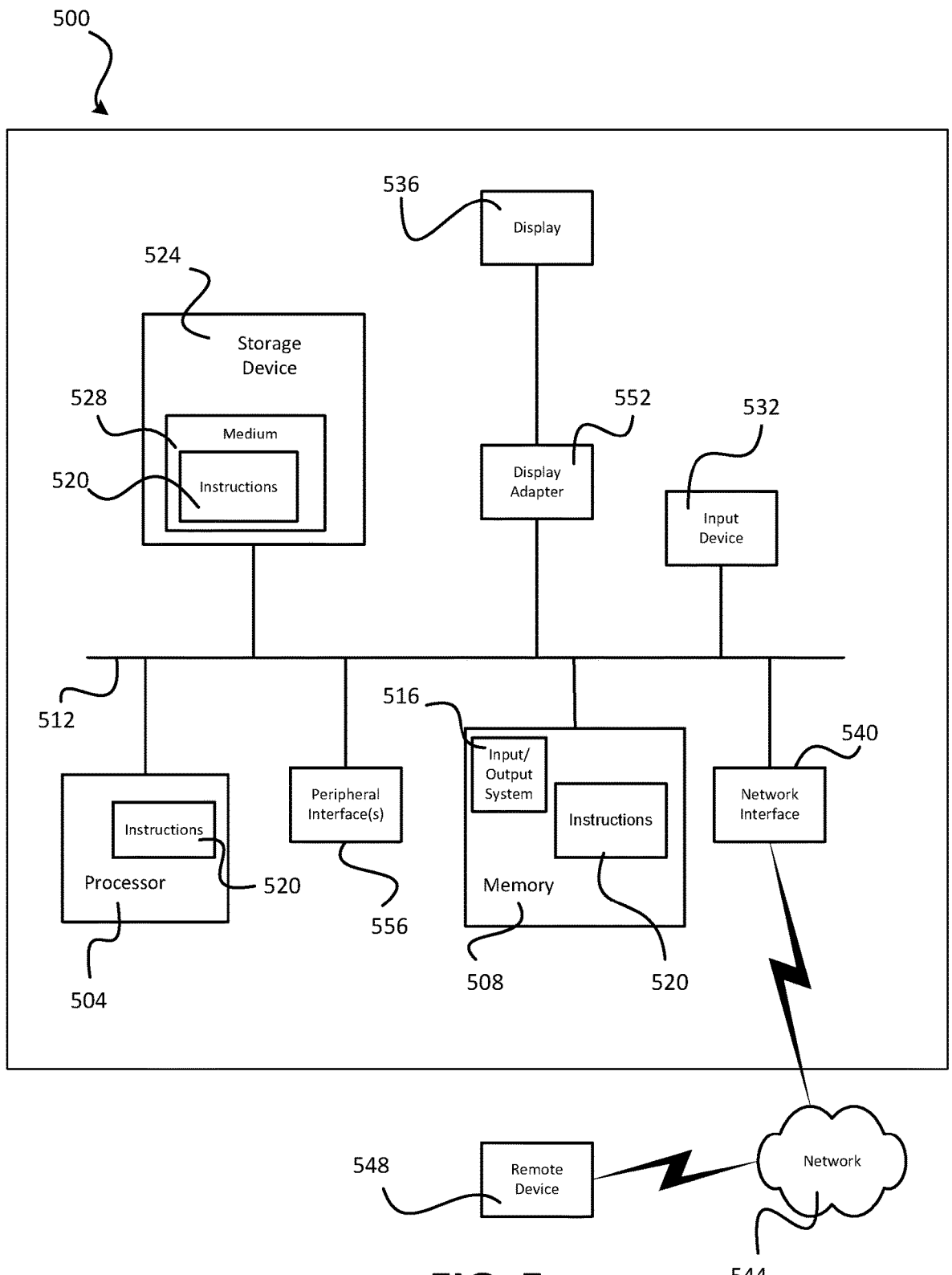
FIG. 5 is a block diagram of a computing system that can be used to implement any one or more of the methodologies disclosed herein and any one or more portions thereof.

FIG. 5 shows a diagrammatic representation of one embodiment of a computing device in the exemplary form of a computer system 500 within which a set of instructions for causing a control system, such as a cancellation system like cancellation system 200 of FIG. 2 and/or cancellation system 300 FIG. 3, to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 500 includes a processor 504 and a memory 508 that communicate with each other, and with other components, via a bus 512. Bus 512 may include any of several types of bus structures including, but not limited to, a memory bus, a memory controller, a peripheral bus, a local bus, and any combinations thereof, using any of a variety of bus architectures.

Memory 508 may include various components (e.g., machine-readable media) including, but not limited to, a random access memory component, a read only component, and any combinations thereof. In one example, a basic input/output system 516 (BIOS), including basic routines that help to transfer information between elements within computer system 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Computer system 500 may also include a storage device 524. Examples of a storage device (e.g., storage device 524) include, but are not limited to, a hard disk drive, a magnetic disk drive, an optical disc drive in combination with an optical medium, a solid-state memory device, and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 524 (or one or more components thereof) may be removably interfaced with computer system 500 (e.g., via an external port connector (not shown)). Particularly, storage device 524 and an associated machine-readable medium 528 may provide nonvolatile and/or volatile storage of machine-readable instructions, data structures, program modules, and/or other data for computer system 500. In one example, software 520 may reside, completely or partially, within machine-readable medium 528. In another example, software 520 may reside, completely or partially, within processor 504.

Computer system 500 may also include an input device 532. In one example, a user of computer system 500 may enter commands and/or other information into computer system 500 via input device 532. Examples of an input device 532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 532 may be interfaced to bus 512 via any of a variety of interfaces (not shown) including, but not limited to, a serial interface, a parallel interface, a game port, a USB interface, a FIREWIRE interface, a direct interface to bus 512, and any combinations thereof. Input device 532 may include a touch screen interface that may be a part of or separate from display 536, discussed further below. Input device 532 may be utilized as a user selection device for selecting one or more graphical representations in a graphical interface as described above.

A user may also input commands and/or other information to computer system 500 via storage device 524 (e.g., a removable disk drive, a flash drive, etc.) and/or network interface device 540. A network interface device, such as network interface device 540, may be utilized for connecting computer system 500 to one or more of a variety of networks, such as network 544, and one or more remote devices 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 544, may employ a wired and/or a wireless mode of communication. In general, any network topology may be used. Information (e.g., data, software 520, etc.) may be communicated to and/or from computer system 500 via network interface device 540.

Computer system 500 may further include a video display adapter 552 for communicating a displayable image to a display device, such as display device 536. Examples of a display device include, but are not limited to, a liquid crystal display (LCD), a cathode ray tube (CRT), a plasma display, a light emitting diode (LED) display, and any combinations thereof. Display adapter 552 and display device 536 may be utilized in combination with processor 504 to provide graphical representations of aspects of the present disclosure. In addition to a display device, computer system 500 may include one or more other peripheral output devices including, but not limited to, an audio speaker, a printer, and any combinations thereof. Such peripheral output devices may be connected to bus 512 via a peripheral interface 556. Examples of a peripheral interface include, but are not limited to, a serial port, a USB connection, a FIREWIRE connection, a parallel connection, and any combinations thereof.

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of performing cancellation for acoustic or electromagnetic measurement or communications, comprising:
    receiving an output signal to be applied to a transmit transducer;
    introducing a delay to the output signal to produce a delayed output signal;
    applying the delayed output signal to the transmit transducer;
    receiving an input signal from a receiving transducer, wherein the input signal comprises at least a portion of the delayed output signal; and
    iteratively solving a Wiener filter problem as a function of the input signal, the output signal, and the delay to produce a first filtered input signal;
    wherein the delay is introduced to reduce the difference between a causal Wiener filter solution and a non-causal Wiener filter solution to improve self-interference cancellation.

2. A method of performing cancellation according to claim 1, further comprising:
    iteratively solving a Wiener filter problem as a function of the first filtered input signal, the complex conjugate of the output signal, and the delay to produce a second filtered input signal; and
    summing the first filtered input signal and the second filtered input signal.

3. A method of performing cancellation according to claim 2, further comprising:

iteratively solving a Wiener filter problem as a function of the first filtered input signal, the square or the cube of the output signal, and the delay to produce a third filtered input signal; and summing the first filtered input signal and the third filtered input signal.

4. A method of performing cancellation in accordance with claim 2, further comprising:

iteratively solving a Wiener filter problem as a function of the first filtered input signal, the delayed output signal, and the delay to produce a fourth filtered input signal; and applying adaptive cancellation to the first filtered input signal as a function of the fourth filtered input signal.

5. A method of performing cancellation according to claim 1, further comprising:

iteratively solving a Wiener filter problem as a function of the first filtered input signal, the square or the cube of the output signal, and the delay to produce a third filtered input signal; and summing the first filtered input signal and the third filtered input signal.

6. A method of performing cancellation in accordance with claim 5, further comprising:

iteratively solving a Wiener filter problem as a function of the first filtered input signal, the delayed output signal, and the delay to produce a fourth filtered input signal; and applying adaptive cancellation to the first filtered input signal as a function of the fourth filtered input signal.

7. A method of performing cancellation according to claim 1, further comprising:

iteratively solving a Wiener filter problem as a function of the first filtered input signal, the delayed output signal, and the delay to produce a fourth filtered input signal; and applying adaptive cancellation to the first filtered input signal as a function of the fourth filtered input signal.

8. A method of performing cancellation according to claim 7, further comprising:

iteratively solving a Wiener filter problem as a function of the first filtered input signal and the fourth filtered input signal to produce a fifth filtered input signal.

9. A method of performing cancellation for acoustic or electromagnetic measurement or communications, comprising:

receiving an output signal to be applied to a transmit transducer;

introducing a delay to the output signal to produce a delayed output signal;

applying the delayed output signal to the transmit transducer;

receiving a digitally sampled signal derived from transmit transducer circuitry;

receiving an input signal from a receiving transducer, wherein the input signal comprises at least a portion of the delayed output signal; and iteratively solving a Wiener filter problem as a function of the input signal, the output signal, the digitally sampled signal, and the delay to produce a first filtered input signal;

wherein the delay is introduced to reduce the difference between a causal Wiener filter solution and a non-causal Wiener filter solution to improve self-interference cancellation.

10. A method of performing cancellation according to claim 9, further comprising:

iteratively solving a Wiener filter problem as a function of the first filtered input signal, the complex conjugate of the output signal, and the delay to produce a second filtered input signal; and summing the first filtered input signal and the second filtered input signal.

11. A method of performing cancellation according to claim 10, further comprising:

iteratively solving a Wiener filter problem as a function of the first filtered input signal, the square or the cube of the output signal, and the delay to produce a third filtered input signal; and summing the first filtered input signal and the third filtered input signal.

12. A method of performing cancellation according to claim 9, further comprising:

iteratively solving a Wiener filter problem as a function of the first filtered input signal, the square or the cube of the output signal, and the delay to produce a third filtered input signal; and summing the first filtered input signal and the third filtered input signal.

13. A method of performing cancellation according to any one of claims 1 to 12, further comprising:

applying the first filtered input signal to a cancellation transducer.

14. A method of performing cancellation according to any one of claims 1 to 12, further comprising:

weighting the input signal with a weighting function prior to solving the Wiener filter problem as a function of the input signal.

15. A method of performing cancellation according to any one of claims 1 to 12, wherein the output signal is a modulated data source signal.

16. A method of performing cancellation according to any one of claims 1 to 12, further comprising demodulating a signal to reproduce a data source signal.

17. A method of performing cancellation according to any one of claims 1 to 12, further comprising correlating the first filtered input signal with the output signal to produce a measurement, wherein the transmit transducer is an acoustic transducer.

18. A method of performing cancellation according to any one of claims 1 to 12, further comprising correlating the first filtered input signal with the output signal to produce a measurement, wherein the transmit transducer is an electromagnetic transducer.

19. A cancellation system for acoustic measurement or communications, comprising:

circuitry configured to generate a signal to be transmitted;

a delay element that applies a delay to the signal to be transmitted to produce a delayed signal for transmitting;

a cancellation signal generator that produces a cancellation signal from the signal to be transmitted;

a receiving transducer;

a low-noise amplifier; and a summing junction configured to (1) add a signal received from the receiving transducer and the cancellation signal to produce a filtered signal and (2) provide the filtered signal to the low-noise amplifier;

wherein the delay is introduced to reduce the difference between a causal Wiener filter solution and a non-causal Wiener filter solution to improve self-interference cancellation.

20. A cancellation system according to claim 19, further comprising a cancellation transducer configured to transmit a signal as a function of the cancellation signal.

21. A cancellation system according to claim 20, further comprising a transmit transducer, wherein the receiving transducer is in acoustic communication with the transmit transducer.

22. A cancellation system according to claim 21, wherein the cancellation transducer is in acoustic communication with the transmit transducer and the cancellation transducer has a power rating in the range of 0.00001% to 75% of the power rating of the transmit transducer.

23. A cancellation system according to claim 21, wherein the cancellation transducer is the receiving transducer.

24. A cancellation system according to claim 21, wherein the cancellation transducer is collocated with the transmit transducer and the cancellation transducer has a power rating in the range of 0.00001% to 75% of the power rating of the transmit transducer.

25. A cancellation system according to claim 21, wherein the cancellation transducer is bonded to the transmit transducer.

* * * * *